(12) United States Patent
Fukuda (10) Patent No.: US 10,654,215 B2
(45) Date of Patent: May 19, 2020

(54) MOLDING DIE DEVICE AND MOLDING METHOD (71) Applicant: Kyoraku Co., Ltd., Kyoto-Shi, Kyoto (JP)

(72) Inventor: Tatsuya Fukuda, Kanagawa (JP)

(73) Assignee: Kyoraku Co., Ltd., Kyoto (JP)

( * ) Notice: Subject to any disclaimer, the term of this patent is extended or adjusted under 35 U.S.C. 154(b) by 0 days.

(21) Appl. No.: 15/756,642

(22) PCT Filed: Sep. 2, 2016

(86) PCT No.: PCT/JP2016/075776
§ 371 (c)(1),
(2) Date: Mar. 1, 2018

(87) PCT Pub. No.: WO2017/038969
PCT Pub. Date: Mar. 9, 2017

(65) Prior Publication Data
US 2018/0243969 A1 Aug. 30, 2018

(30) Foreign Application Priority Data

Sep. 2, 2015 (JP) .................................. 2015-173018

(51) Int. Cl.
*B29C 51/36* (2006.01)
*B29C 49/04* (2006.01)
(Continued)

(52) U.S. Cl.
CPC .............. *B29C 51/36* (2013.01); *B29C 49/04* (2013.01); *B29C 49/42* (2013.01); *B29C 51/26* (2013.01);
(Continued)

(58) Field of Classification Search
CPC ....... B29C 51/36; B29C 51/30; B29C 51/343; B29C 51/26; B29C 51/38; B29C 51/10;
(Continued)

(56) References Cited

U.S. PATENT DOCUMENTS

2012/0060960 A1   3/2012   Sumi et al.
2012/0061886 A1   3/2012   Sumi et al.
(Continued)

FOREIGN PATENT DOCUMENTS

CN    1671535 A      9/2005
CN    102431146 A    5/2012
(Continued)

OTHER PUBLICATIONS

International Search Report dated Nov. 8, 2016 during the prosecution of International Patent Application No. PCT/JP2016/075776.
(Continued)

*Primary Examiner* — Matthew J Daniels
*Assistant Examiner* — Abhishek A Patwardhan
(74) *Attorney, Agent, or Firm* — Maier & Maier, PLLC (57) ABSTRACT

A molding die device is provided for bringing a resin sheet into close contact with a pair of dies by vacuum suction from a cavity surface to perform molding. An outer frame portion is formed integrally with an outer peripheral portion of the respective dies arranged to face each other. Moreover, one of the dies has a recessed portion formed at the position of the one of the dies facing the outer frame portion of the other die and configured so that the outer frame portion of the one of the dies can be housed in the recessed portion. The outer frame portion is formed to protrude most in each die. Upon molding, the dies are clamped together after vacuum suction has been performed with the resin sheet being arranged in contact with the outer frame portions.

7 Claims, 6 Drawing Sheets (51) Int. Cl.
| | |
|---|---|
| *B29C 49/42* | (2006.01) |
| *B29C 51/26* | (2006.01) |
| *B29C 48/00* | (2019.01) |
| *B29C 51/02* | (2006.01) |
| *B29C 51/10* | (2006.01) |
| *B29C 48/07* | (2019.01) |
| *B29C 51/16* | (2006.01) |
| *B29C 33/00* | (2006.01) |
| *B29C 51/32* | (2006.01) |

(52) U.S. Cl.
CPC ........ *B29C 33/005* (2013.01); *B29C 48/0016* (2019.02); *B29C 48/0017* (2019.02); *B29C 48/07* (2019.02); *B29C 49/4236* (2013.01); *B29C 51/02* (2013.01); *B29C 51/10* (2013.01); *B29C 51/16* (2013.01); *B29C 51/267* (2013.01); *B29C 51/32* (2013.01); *B29C 2791/006* (2013.01)

(58) Field of Classification Search
CPC ..... B29C 51/267; B29C 51/32; B29C 33/005; B29C 33/20; B29C 33/308; B29C 33/3814; B29C 33/18; B29C 55/00; B29C 48/0016; B29C 49/0047
See application file for complete search history.

(56) References Cited

U.S. PATENT DOCUMENTS

2013/0316500 A1\* 11/2013 Ota ................. H01L 23/49541
  438/119
2015/0290868 A1  10/2015 Tanji

FOREIGN PATENT DOCUMENTS

| JP | H05-016218 A | 1/1993 |
|---|---|---|
| JP | H06-335956 A | 12/1994 |
| JP | 2000-289093 A | 10/2000 |
| JP | 2009-023128 A | 2/2009 |
| JP | 2012-192521 A | 10/2012 |
| JP | 2012-192522 A | 10/2012 |

OTHER PUBLICATIONS

XP002788238, Database WPI. Week 199508, Thomson Scientific, London, GB; AN 1995-057167, 2 pages (Dec. 6, 1994) Cited in EESR dated Feb. 4, 2019 issued in EP 16814998.4; with translation of JPH06-335956A.
Supplementary European Search Report dated Feb. 4, 2019 issued in corresponding European Patent Application No. 16814998.4.
Office Action dated Apr. 22, 2019 in corresponding Chinese Patent Application No. 201680049850.8 (in Chinese).

\* cited by examiner

MOLDING DIE DEVICE AND MOLDING METHOD

CROSS-REFERENCE TO RELATED APPLICATIONS

This is a U.S. national phase application under 35 U.S.C. § 371 of International Patent Application No. PCT/JP2016/075776, filed Sep. 2, 2017, and claims benefit of priority to Japanese Patent Application No. 2015-173018, filed Sep. 2, 2015. The entire contents of these applications are hereby incorporated by reference.

FIELD OF TECHNOLOGY

The present invention relates to a molding die device for performing vacuum molding for a resin sheet. Further, the present invention relates to a molding method using the molding die device.

BACKGROUND

For example, in the case of forming a resin molded article with a single wall structure, vacuum molding or pressure molding is performed such that after a thermoplastic resin original fabric sheet prepared in advance has been reheated to a molten state, the sheet closely contacts a die cavity by vacuum suction or air pressure. Vacuum molding or pressure molding has characteristics such as a characteristic suitable for high-mix low-volume production. Moreover, the applicant of the present application has developed a molding technique including bringing each of two extruded resin sheets into close contact with a corresponding one of dies in a pair by vacuum suction and subsequently clamping the dies to integrate these two resin sheets together.

In this type of vacuum molding or pressure molding, the heated molten resin sheet needs to be reliably in close contact with a cavity surface of the die. With poor close contact of the resin sheet with a die cavity, the surface shape of the die cannot be sufficiently transferred. For this reason, a resin molded article with predetermined quality cannot be obtained.

Meanwhile, the die shape has been diversified due to resin molded article diversification. For this reason, it is difficult to perform vacuum suction for the resin sheet in some cases. For bringing the resin sheet into close contact with the die cavity, vacuum suction is performed after a tip end of the die has contacted the resin sheet. However, in this state, the resin sheets contacting the dies need to form a closed space.

Among the above-described various dies, there is, however, a die having a parting line in a complicated (three-dimensionally curved) shape, for example. In this case, a clearance is also formed between the die and the resin sheet stacked in contact with the die. That is, there is a problem that it is difficult to form the closed space.

In view of such a situation, an attempt has been made to modify the die for forming the closed space. For example, JP-A-2012-192521 discloses a molding device configured so that thermoplastic resin extruded in a sheet shape from an extruding machine can closely contact a frame positioned at the periphery of a die. This molding device is configured such that a tip end surface of the frame is in a single plane. With this configuration, even when the shape of a parting line of the die is complicated, a resin sheet is arranged in contact with the frame, thereby forming a closed space. As a result, vacuum suction can be reliably performed.

Moreover, JP-A-5-16218 discloses a vacuum molding die used for bonding, at the same time as vacuum molding, a skin material in the form of a thin sheet to a surface of a base material set on the vacuum molding die, the base material being in a shape having a recessed surface portion at a substantially center portion. A frame protruding higher than an outer edge portion of the base material is provided at a portion of the vacuum molding die positioned at an outer peripheral portion of the set base material. It is described that upon vacuum molding of the skin material set on the frame, molding is performed such that the skin material comes into contact with the recessed surface portion in advance of the outer edge portion of the base material.

SUMMARY

However, in, e.g., the configuration of providing the frame as described in JP-A-2012-192521, a die structure drive mechanism is complicated. Thus, there is a problem that tremendous facility investment is needed. Moreover, the purpose of the technique described in JP-A-5-16218 is reduction in adhesive failure and dent of a skin material of a molded article having a recessed surface portion, and is significantly different from an object of the present invention. Further, in the invention described in JP-A-5-16218, vacuum molding is performed using the single die. In JP-A-5-16218, the molding technique including bringing each of the two extruded resin sheets into close contact with a corresponding one of the dies in a pair by vacuum suction and subsequently clamping the dies to integrate these two resin sheets together is not assumed.

The present invention has been proposed in view of the above-described typical situation. That is, it is intended to provide a molding die device configured so that close contact of a resin sheet with a die cavity can be reliably made without a complicated die structure and a complicated drive mechanism. Further, the present invention is intended to provide a molding method by the molding die device. In addition, the present invention is intended to provide a molding die device applicable to a molding technique including bringing each of two extruded resin sheets into close contact with a corresponding one of dies in a pair by vacuum suction and subsequently clamping the dies to integrate these two resin sheets together. Moreover, the present invention is intended to provide a molding method by the molding die device.

To achieve the above-described object, a molding die device of the present invention is a molding die device for bringing a resin sheet into close contact with a pair of dies by vacuum suction from a cavity surface to perform molding processing, wherein an outer frame portion is formed integrally with an outer peripheral portion of the respective dies arranged to face each other, a recessed portion is formed at a position of one of the dies, the position facing the outer frame portion of the other die, the recessed portion being capable of housing the outer frame portion of the one of the dies, and the outer frame portion is formed to protrude most in each die.

Moreover, a molding method of the present invention is a molding method for bringing a resin sheet into close contact with a pair of dies by vacuum suction from a cavity surface to perform molding, including: clamping, by means of a molding die device, the dies together after vacuum suction has been performed with the resin sheet being arranged in contact with outer frame portions of the dies, wherein in the molding die device, the outer frame portion is formed integrally with an outer peripheral portion of the respective dies arranged to face each other, a recessed portion is formed at a position of one of the dies, the position facing the outer frame portion of the other die, the recessed portion being capable of housing the outer frame portion of the one of the dies, and the outer frame portion is formed to protrude most in each die.

The tallest outer frame portion is provided at each die such that the resin sheet first comes into contact with the outer frame portion. With this configuration, a space between the resin sheet and the die cavity surface forms a closed space regardless of the shape of the die. When vacuum suction is performed in this state, close contact of the resin sheet with the die cavity surface is reliably made without air leakage.

The recessed portion in which the outer frame portion can be housed is formed at the position of the die facing the outer frame portion. Thus, when the dies in a pair are clamped together in a butting state, the outer frame portions do not collide with each other. Consequently, a predetermined clamping state can be brought.

According to the present invention, close contact of the resin sheet with the die cavity can be reliably made without a complicated die structure and a complicated drive mechanism. Thus, a high-quality resin molded article can be molded. Moreover, the present invention is applicable to the molding technique including bringing each of the two extruded resin sheets into close contact with a corresponding one of the dies in a pair by vacuum suction and subsequently clamping the dies to integrate these two resin sheets together. Thus, the present invention is available for molding of various types of resin molded articles.

DETAILED DESCRIPTION

An embodiment of a molding die device and a molding method will be described in detail below with reference to the drawings, the present invention being applied to the embodiment.

Figure 1:
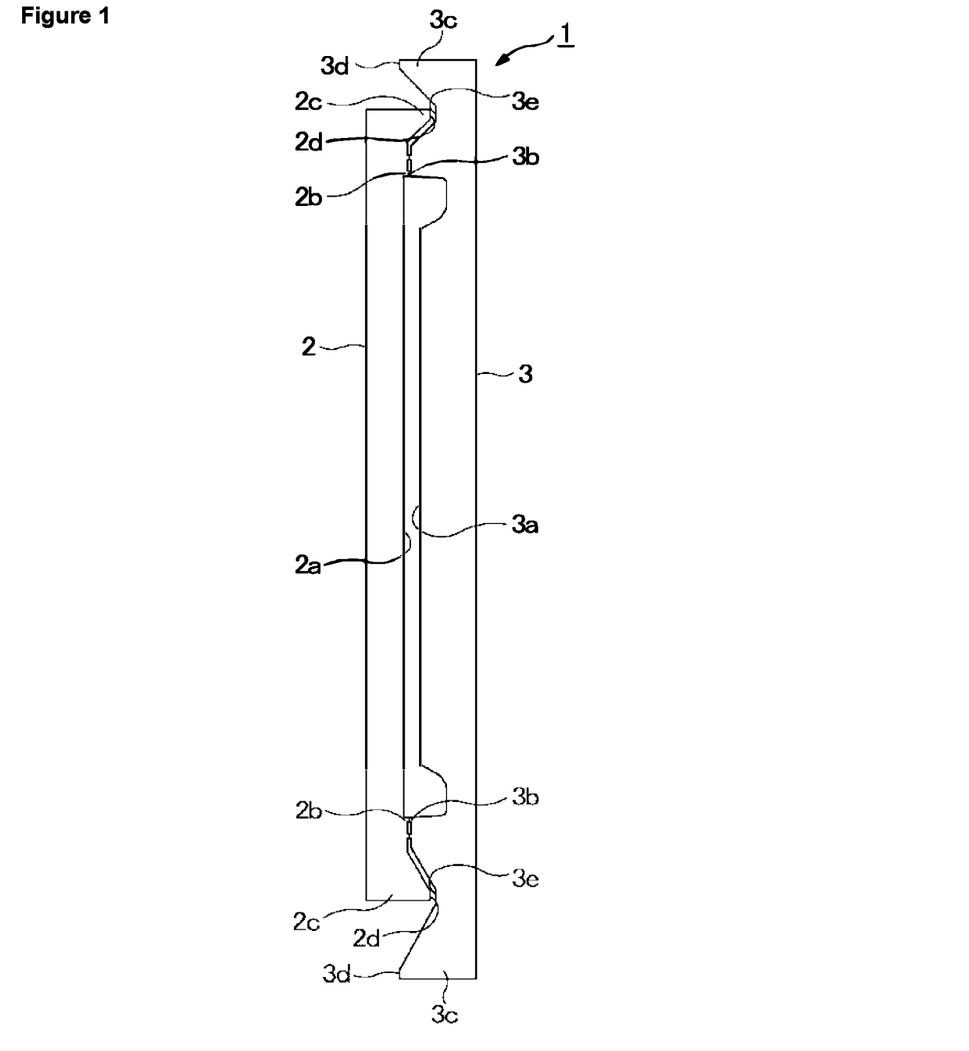
FIG. 1 is a schematic side view of one embodiment of a molding die device to which the present invention is applied.
Figure 2:
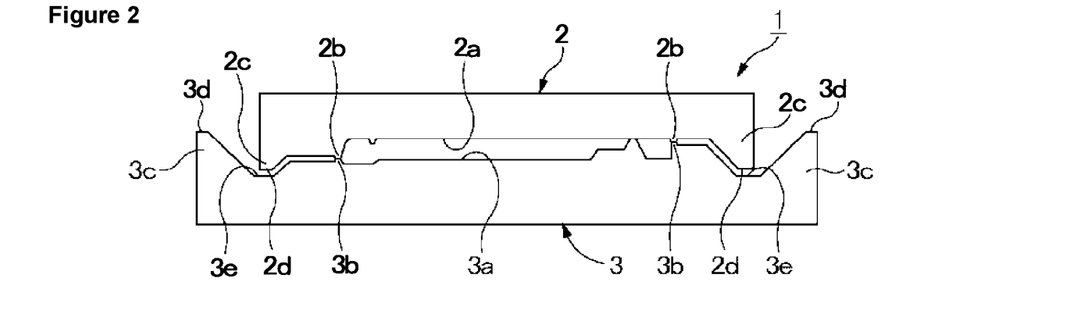
FIG. 2 is a schematic plan view of the molding die device illustrated in FIG. 1.

The molding die device of the present embodiment is a device configured to perform, after a resin sheet has been brought into close contact with each of dies in a pair, clamping to integrate these resin sheets together, thereby molding a hollow resin molded article. Thus, as illustrated in FIGS. 1 and 2, the molding die device 1 of the present embodiment is configured such that the butting dies 2, 3 in a pair are arranged to face each other.

Each of the dies 2, 3 has a cavity. The resin sheet is brought into close contact with each of die cavity surfaces $2a$, $3a$, and therefore, the shape of each of the die cavity surfaces $2a$, $3a$ is transferred to the resin sheet. Moreover, a pinch-off portion $2b$, $3b$ is formed to protrude from the periphery of each of the die cavity surfaces $2a$, $3a$ of the dies 2, 3. By butting these pinch-off portions, peripheral portions of the two resin sheets are welded together to form a parting line (PL) and to integrate the resin sheets together.

In the case of using the molding die device 1 having the above-described configuration to perform vacuum molding for bringing each resin sheet into close contact with a corresponding one of the die cavity surfaces $2a$, $3a$, a vacuum vent is generally formed in advance at each of the die cavity surfaces $2a$, $3a$ of the dies 2, 3. In addition, the resin sheets contact the tall pinch-off portions $2b$, $3b$. In this state, vacuum suction is performed. However, e.g., in the case of a parting line in a complicated shape (e.g., a case where the pinch-off portions $2b$, $3b$ are curved three-dimensionally), even when the planar resin sheets are arranged in contact with the dies (the pinch-off portions $2b$, $3b$), a clearance is formed between the resin sheet and the die. For this reason, it is difficult to perform vacuum suction.

Thus, in the molding die device 1 of the present embodiment, an outer frame portion $2c$, $3c$ is formed at an outer peripheral portion of each of the dies 2, 3. With this configuration, the outer frame portions $2c$, $3c$ can come into contact with the resin sheets in advance of other portions. The outer frame portion $2c$, $3c$ is a rod-shaped die formed integrally with each of the dies 2, 3 across the entire circumference of the outer peripheral portion of the each of the dies 2, 3. The dies 2, 3 are formed to protrude most in a butting direction thereof. That is, the outer frame portions $2c$, $3c$ are tallest at the dies 2, 3.

Figure 3:
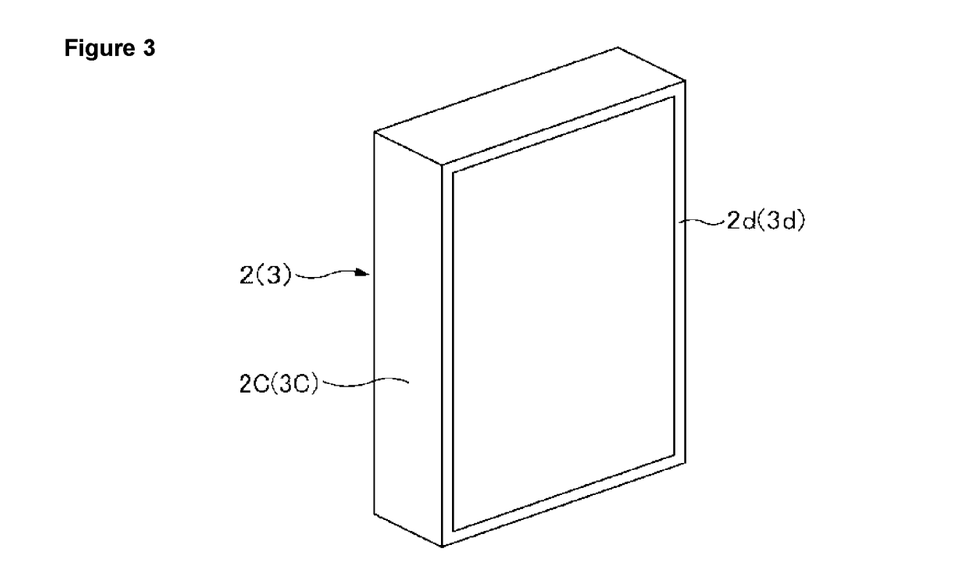
FIG. 3 is a schematic perspective view of one example of an outer frame portion.

A frame-shaped surface (a tip end surface in the butting direction) $2d$, $3d$ of each of the outer frame portions $2c$, $3c$ is formed in a single plane. For example, as illustrated in FIG. 3, the tip end surface $2d$, $3d$ of the outer frame portion $2c$, $3c$ in the butting direction is formed in a rectangular plane. In this case, the height of the outer frame portion $2c$, $3c$ is constant (the same) across the entire circumference thereof. The resin sheets contact these tip end surfaces $2d$, $3d$.

Figure 4:
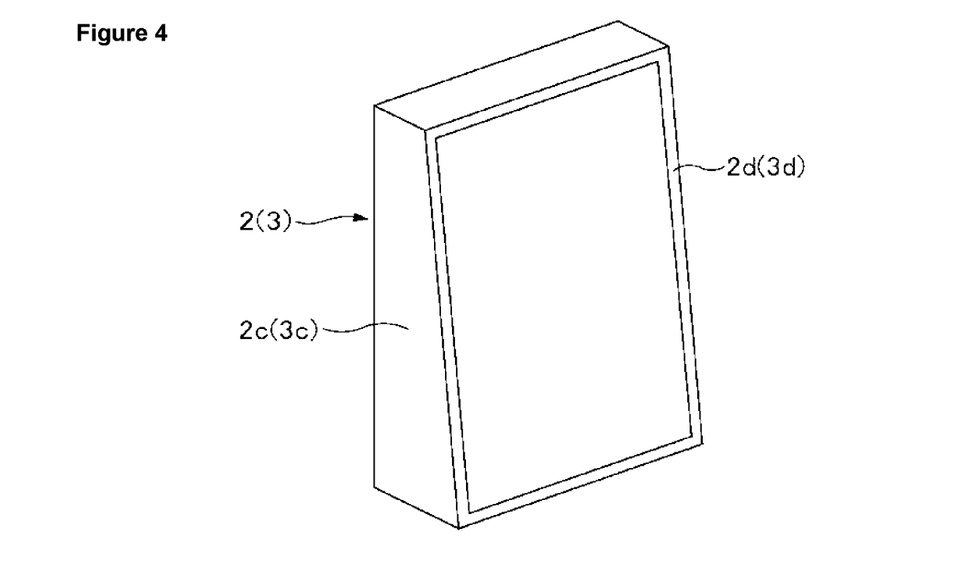
FIG. 4 is a schematic perspective view of another example of the outer frame portion.
Figure 5:
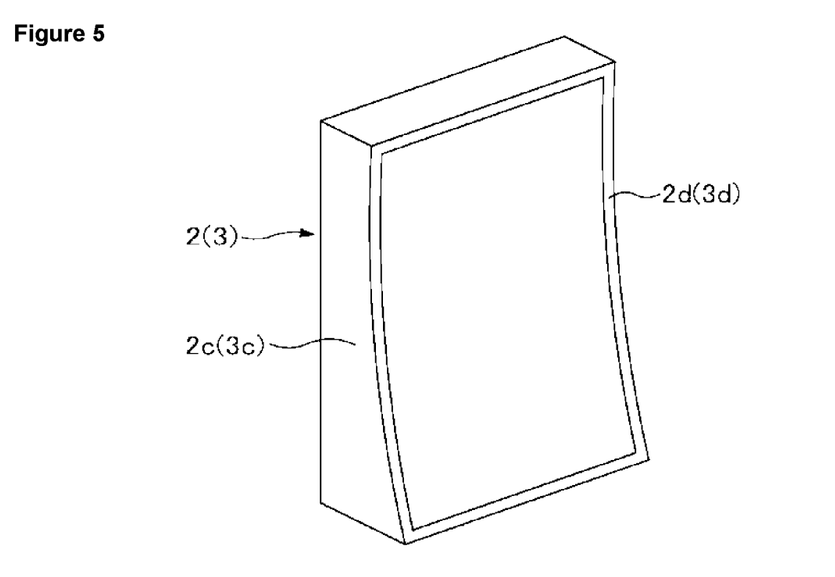
FIG. 5 is a schematic perspective view of still another example of the outer frame portion.

The forms of the outer frame portions $2c$, $3c$ are not limited to above. The outer frame portions $2c$, $3c$ may have such a shape that no clearance is formed upon contact with the resin sheets. For example, the tip end surface $2d$, $3d$ of the outer frame portion $2c$, $3c$ in the butting direction may be formed in an inclined plane or a curved plane. FIG. 4 illustrates an example where the tip end surface $2d$, $3d$ of the outer frame portion $2c$, $3c$ in the butting direction is formed in a single inclined plane. FIG. 5 illustrates an example where the tip end surface $2d$, $3d$ of the outer frame portion $2c$, $3c$ in the butting direction is formed in a single curved plane. For example, in a case where the tip end surface $2d$, $3d$ is formed in the inclined plane as illustrated in FIG. 4, the resin sheet contacts a lower end edge of the outer frame portion $2c$, $3c$, and then, a portion of the resin sheet contacting the tip end surface $2d$, $3d$ expands upward along the inclined plane. In this manner, the resin sheet can smoothly contact the entirety of the tip end surface $2d$, $3d$.

With the outer frame portions $2c$, $3c$ formed at the dies $2$, $3$, the resin sheets inevitably first contact the tip end surfaces $2d$, $3d$ of the outer frame portions $2c$, $3c$. In this state, the tip end surfaces $2d$, $3d$ of the outer frame portions $2c$, $3c$ are not curved three-dimensionally, but are flat. Thus, the tip end surfaces $2d$, $3d$ contact the peripheries of the resin sheets without any clearance. That is, a space between the resin sheet and the die cavity surface $2a$, $3b$ is a closed space. When vacuum suction from the die cavity surfaces $2a$, $3a$ is performed in this state, vacuum suction can be efficiently performed without air leakage. Thus, close contact of the resin sheets with the die cavity surfaces $2a$, $3a$ can be reliably made.

Note that when the tall outer frame portion $2c$, $3c$ is provided at each of the dies $2$, $3$, the tallest outer frame portions $2c$, $3c$ come into contact with each other upon clamping of the dies $2$, $3$. For this reason, clamping cannot be properly performed. Thus, in the molding die device $1$ of the present embodiment, one die $3$ is larger than the other die $2$. Further, the larger die $3$ has a recessed portion $3e$ formed at a position facing the outer frame portion $2c$ of the smaller die $2$ and having such a frame shape that the outer frame portion $2c$ can be housed in the recessed portion $3e$.

Due to such a configuration, the outer frame portion $3c$ of the die $3$ with the larger size is inevitably positioned on the outside of the outer periphery of the die $2$. Thus, the outer frame portion $3c$ does not come into contact with the other die $2$. Moreover, the die $3$ with the larger size has a recessed portion $3e$ formed at a position facing the outer frame portion $2c$ of the die $2$. Thus, the outer frame portion $2c$ does not come into contact with the die $3$, needless to say.

Thus, upon clamping of the dies $2$, $3$, the hollow resin molded article can be, as in a normal die, molded with the pinch-off portions $2b$, $3b$ contacting each other. Moreover, each of the outer frame portions $2c$, $3c$ is formed integrally with a corresponding one of the dies $2$, $3$. Thus, a die structure is not complicated. Further, it is not necessary to separately drive the outer frame portions $2c$, $3c$. Thus, a drive mechanism is not complicated.

Next, the method for molding the resin molded article by means of the above-described molding die device $1$ will be described.

Figure 6A:
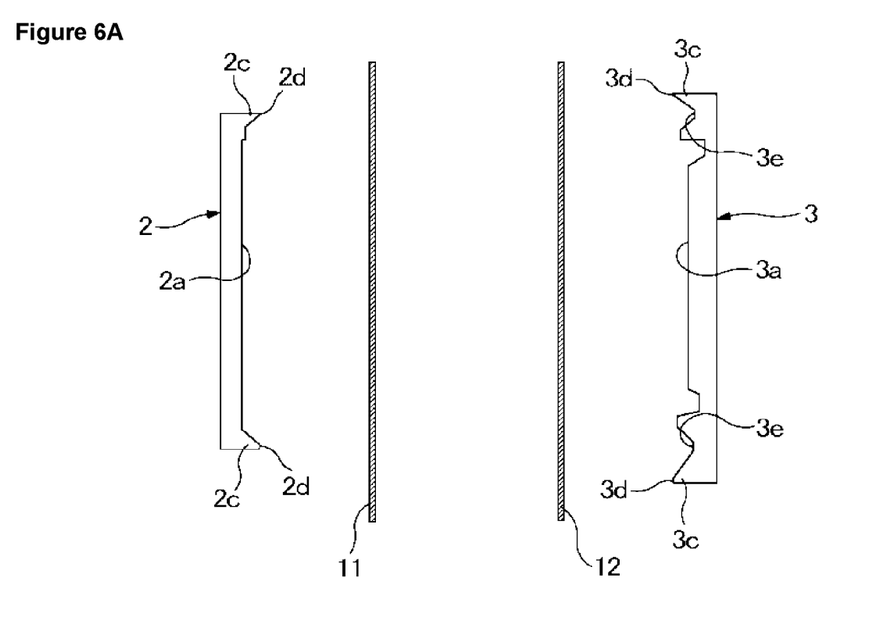
FIG. 6A is a schematic side view of one embodiment of a molding method to which the present invention is applied, the view illustrating a resin sheet extrusion step.

Upon molding, resin sheets $11$, $12$ made of, e.g., thermoplastic resin are first extruded from a T-die as illustrated in FIG. 6A. The extruded resin sheets $11$, $12$ droop down between the divided dies $2$, $3$ in a pair.

Figure 6B:
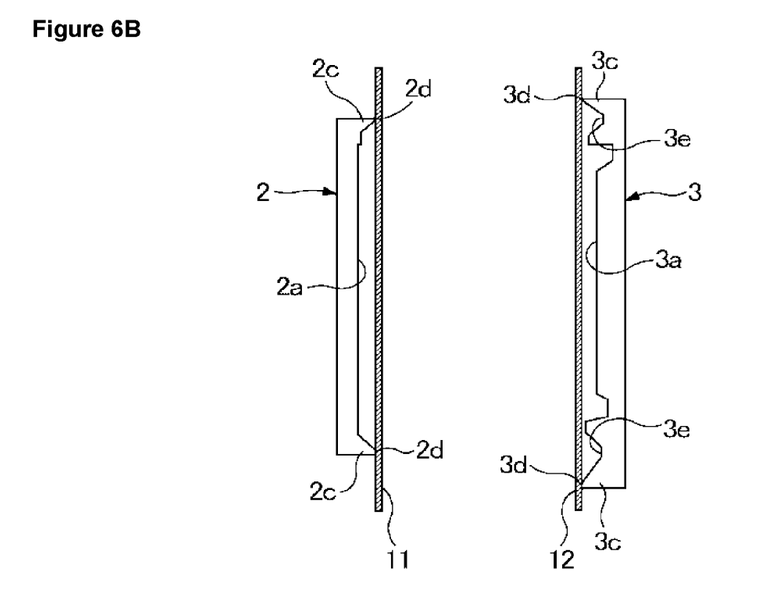
FIG. 6B is a schematic side view of the step of bringing each resin sheet into contact with a corresponding one of dies.

The resin sheets $11$, $12$ pass by the upper positions of the dies $2$, $3$. Thereafter, the divided dies $2$, $3$ move forward to the resin sheets $11$, $12$ as illustrated in FIG. 6B. In this state, the tip end surfaces $2d$, $3d$ of the outer frame portions $2c$, $3c$ of the dies $2$, $3$ each come into contact with the resin sheets $11$, $12$. Thus, the resin sheets $11$, $12$ inevitably droop down along the tip end surfaces $2d$, $3d$ of the outer frame portions $2c$, $3c$. In this state, the resin sheets $11$, $12$ droop down along the tip end surfaces $2d$, $3d$ of the outer frame portions $2c$, $3c$. Thus, friction is generated between the resin sheet $11$, $12$ and the tip end surface $2d$, $3d$. This can provide the effect of decreasing a sheet own weight on each of the resin sheets $11$, $12$ by friction and the effect of reducing drawdown of the resin sheets $11$, $12$.

Figure 6C:
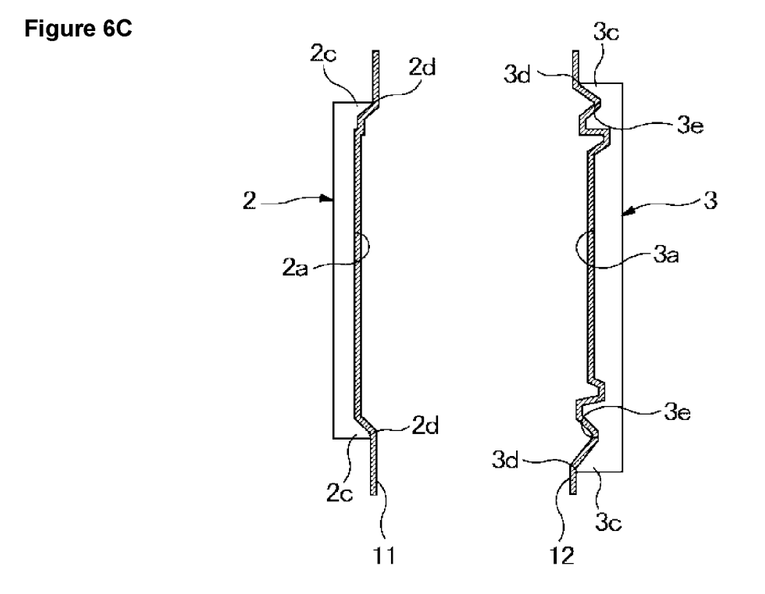
FIG. 6C is a schematic side view of the step of performing vacuum suction for the resin sheets.

At the entire circumference, the tip end surfaces $2d$, $3d$ of the outer frame portions $2c$, $3c$ each contact the resin sheets $11$, $12$. Thereafter, air is sucked through the vacuum vents provided at the die cavity surfaces $2a$, $3a$. In this manner, the resin sheets $11$, $12$ are sucked as illustrated in FIG. 6C. A space between the resin sheet $11$, $12$ and the die $2$, $3$ forms a closed space. Thus, close contact of the resin sheet $11$, $12$ with the die cavity surface $2a$, $3a$ can be reliably made.

Figure 6D:
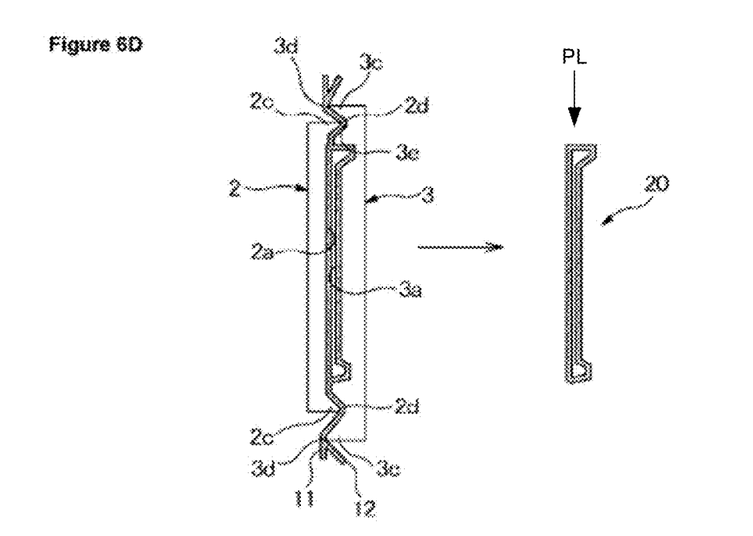
FIG. 6D is a schematic side view of a clamping step and a resin molded article extraction step.

As described above, the resin sheets $11$, $12$ each closely contact the die cavity surfaces $2a$, $3a$. Further, the resin sheets $11$, $12$ are shaped along the die cavity surfaces $2a$, $3a$. Thereafter, the dies $2$, $3$ further move forward as illustrated in FIG. 6D. In this manner, clamping is performed.

Upon clamping as described above, the die $3$ is provided with the recessed portion $3e$ corresponding to the outer frame portion $2c$ of the die $2$. In this form, a tip end portion of the outer frame portion $2c$ is housed in the recessed portion $3e$. Thus, the above-described tip end portion does not contact the die $3$. The pinch-off portion $2b$ of the die $2$ and the pinch-off portion $3b$ of the die $3$ come into contact with each other by clamping, and therefore, the cavities of the two dies $2$, $3$ form the closed space. Meanwhile, peripheral edge portions of the resin sheets $11$, $12$ are welded together. In this manner, a parting line PL is formed at a joint surface between the two resin sheets $11$, $12$. In addition, a closed hollow portion is formed inside the two resin sheets $11$, $12$.

Finally, the dies $2$, $3$ open by moving apart from each other. Thereafter, a resin molded article $20$ is extracted. Then, burrs of an outer peripheral portion are removed. In this manner, the resin molded article $20$ can be molded.

As described above, according to the molding die device and the molding method of the present invention, the die structure and the drive mechanism are not complicated. Thus, the outer frame portions $2c$, $3d$ are utilized so that close contact of the resin sheets $11$ with the die cavity surfaces $2a$, $3a$ can be reliably made. Consequently, a high-quality resin molded article can be molded.

The embodiment to which the present invention is applied has been described above. Note that the present invention is not limited to the above-described embodiment, needless to say. Various changes can be made to the above-described embodiment without departing from the gist of the present invention.

For example, in the previous embodiment, the dies $2$, $3$ each have the three-dimensionally curved pinch-off portions $2b$, $3b$. Moreover, the dies $2$, $3$ are provided with the outer frame portions $2c$, $3c$. With this configuration, the device is configured such that the space between the resin sheet $11$, $12$ and the die $2$, $3$ forms the closed space. Thus, the present invention is not limited to a three-dimensionally curved die, and is also applicable to any die which might lead to a clearance between a resin sheet and the die.

Figure 7:
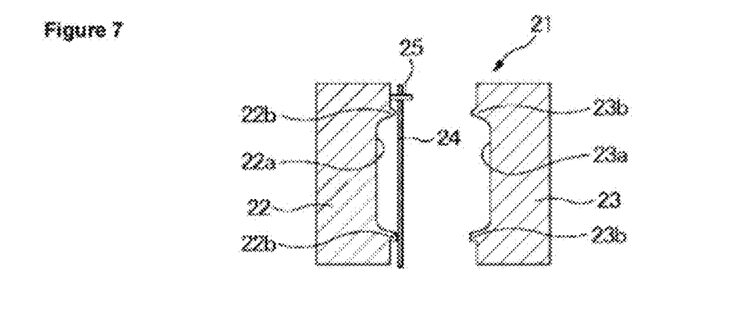
FIG. 7 is a view of one example of a die having a pin configured to hold a skin material.

FIG. $4$ is one example of a molding die device configured to perform molding with a skin material being stacked on a resin sheet. A molding die device $21$ illustrated in FIG. $7$ also includes dies $22$, $23$ divided in two. The dies $22$, $23$ each have die cavity surfaces $22a$, $23a$. In addition, these dies each have pinch-off portions $22b$, $23b$. Moreover, in the case of this example, a fixation pin $25$ for fixing a skin material $24$ in advance is provided at one die $22$.

In the molding die device $21$ configured as described above, the pinch-off portions $22b$, $23b$ of the dies $22$, $23$ are not curved three-dimensionally. However, the fixation pin $25$ more protrudes than the pinch-off portions $22$. Thus, in this form, when a resin sheet is arranged to contact the die $22$, a portion of the resin sheet is lifted by the fixation pin $25$. Thus, a clearance is formed, and therefore, air leaks upon vacuum suction.

Figure 8:
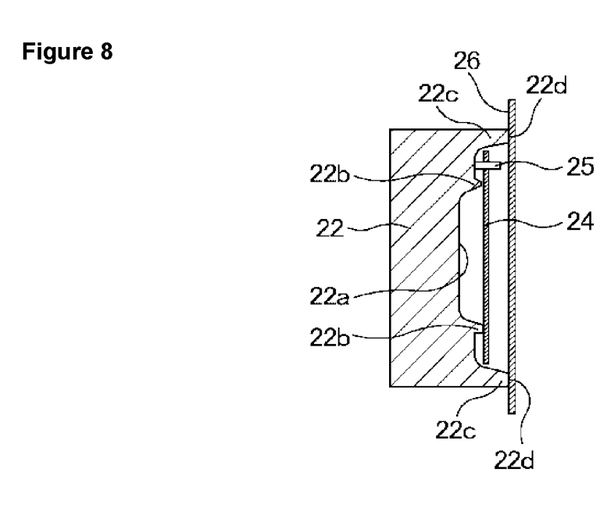
FIG. 8 is a view of an embodiment in which the present invention is applied to the die having the pin configured to hold the skin material.

Thus, it is also effective to form an outer frame portion in this molding die device $21$. FIG. $8$ illustrates such a form that an outer frame portion $22c$ is formed at the die $22$ having the fixation pin 25 for fixing the skin material 24. The outer frame portion 22c is formed in a frame shape integrally with the die 22 across the entire circumference of an outer peripheral portion of the die 22. The outer frame portion 22c is formed to protrude most in a butting direction of the die 22. That is, the outer frame portion 22c is taller than the fixation pin 25. Moreover, a frame-shaped tip end surface (a surface which is to contact the resin sheet) 22d of the outer frame portion 22c is formed in a single plane. That is, the height of the outer frame portion 22c is constant (the same) across the entire circumference thereof.

With the above-described configuration, the die can contact the resin sheet without any clearance even in the case of placing the fixation pin 25. Thus, close contact of the resin sheet with the die cavity surface 22a can be reliably made by vacuum suction. Note that as in the case of the previous embodiment, a configuration such as a configuration in which a recessed portion in which the outer frame portion 22c can be housed is formed at the other die is employed so that contact of the outer frame portion 22c with the other die can be prevented.

The invention claimed is:

1. A molding die device for bringing a resin sheet into close contact with a pair of dies by vacuum suction from a cavity surface to perform molding processing, wherein the respective dies have a cavity, the molding die device comprising:
    pinch-off portions formed to protrude at positions abutting each other from a periphery of a cavity surface of each of the cavities,
    an outer frame portion formed integrally with an outer peripheral portion of the respective pinch-off portions of the dies arranged to face each other,
    a recessed portion is formed at a position of one of the dies, the position facing the outer frame portion of the other die, the recessed portion being capable of housing the outer frame portion of the other die, and
    the outer frame portion is formed to protrude more than the pinch-off portion.

2. The molding die device according to claim 1, wherein a size of the one of the dies is larger than that of the other die, and
    the die with the larger size is provided with the recessed portion capable of housing the outer frame portion of the die with the smaller size upon butting of the dies.

3. A molding method for bringing a resin sheet into close contact with a pair of dies by vacuum suction from a cavity surface to perform molding, comprising:
    clamping, by means of the molding die device of claim 1, the dies together after vacuum suction has been performed with the resin sheet being arranged in contact with outer frame portions of the dies.

4. The molding die device according to claim 1, wherein the pinch-off portions come into contact with each other and a parting line is formed upon butting of the dies.

5. The molding die device according to claim 1, wherein a height of the outer frame portion is the same across the entire circumference.

6. The molding die device according to claim 1, wherein a shape of a tip end surface in a butting direction of the outer frame constitutes an inclined plane or a curved plane, wherein the pinch-off portion on each of the pair of dies are contacted each other in the butting direction, and the tip end surface is an entire circumferential tip of the outer frame portion.

7. The molding die device according to claim 1, wherein the pinch-off portions are three-dimensionally curved.

* * * * *